United States Patent
Li et al.

(10) Patent No.: US 10,419,542 B2
(45) Date of Patent: Sep. 17, 2019

(54) TRANSMISSION CONTROL PROTOCOL (TCP) SYNCHRONIZE (SYN) SIGNALING PASSTHROUGH FOR TCP PROXY SERVERS

(71) Applicant: Verizon Patent and Licensing Inc., Basking Ridge, NJ (US)

(72) Inventors: Feng Li, Lexington, MA (US); Jae Won Chung, Lexington, MA (US); Fenglin Yin, Lexington, MA (US); Vivian H. Lu, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 244 days.

(21) Appl. No.: 15/660,069

(22) Filed: Jul. 26, 2017

(65) Prior Publication Data
US 2019/0037025 A1  Jan. 31, 2019

(51) Int. Cl.
*G06F 15/16* (2006.01)
*H04L 29/08* (2006.01)

(52) U.S. Cl.
CPC .......... *H04L 67/14* (2013.01); *H04L 67/2804* (2013.01)

(58) Field of Classification Search
CPC ..... H04L 67/14; H04L 67/2804; H04L 69/16; H04L 69/163; H04L 69/168
See application file for complete search history.

(56) References Cited

U.S. PATENT DOCUMENTS

| | | | | |
|---|---|---|---|---|
| 6,473,406 B1 * | 10/2002 | Coile | ........ | H04L 29/06 370/248 |
| 8,613,089 B1 * | 12/2013 | Holloway | ........ | H04L 63/1458 726/23 |
| 8,984,635 B1 * | 3/2015 | Graham-Cumming | ........ | H04L 9/3239 726/23 |
| 2007/0112962 A1 * | 5/2007 | Lewontin | ........ | H04L 69/16 709/227 |
| 2010/0281168 A1 * | 11/2010 | Li | ........ | H04L 45/00 709/227 |
| 2018/0176189 A1 * | 6/2018 | Paul | ........ | H04L 63/0428 |
| 2018/0359329 A1 * | 12/2018 | Vacaro | ........ | H04L 49/3009 |

* cited by examiner

*Primary Examiner* — Jonathan A Bui (57) ABSTRACT

A device can receive, from a user device, a transmission control protocol (TCP) synchronize (SYN) packet associated with a request to establish a TCP connection with a server device. The device can prevent a first TCP connection from being established between the device and the user device based on the TCP SYN packet. The device can cause a second TCP connection to be established between the device and the server device based on the TCP SYN packet and after preventing the first TCP connection from being established. The device can cause a third TCP connection to be established between the device and the user device after causing the second TCP connection to be established. The device can transfer network traffic between the user device and the server device based on the second TCP connection and the third TCP connection.

20 Claims, 9 Drawing Sheets

TRANSMISSION CONTROL PROTOCOL (TCP) SYNCHRONIZE (SYN) SIGNALING PASSTHROUGH FOR TCP PROXY SERVERS

BACKGROUND

A socket is an internal endpoint for sending and receiving data by a device in a network. A protocol stack enables processes to communicate via a network using sockets. A process can send and receive data via a socket using socket application programming interface (API) calls.

DETAILED DESCRIPTION OF PREFERRED EMBODIMENTS

The following detailed description of example implementations refers to the accompanying drawings. The same reference numbers in different drawings can identify the same or similar elements.

A server device can provide, to a user device, data associated with particular applications and/or services (e.g., Internet services, such as streaming media services, multimedia services, social media services, Internet protocol television (IPTV) services, or the like) using particular transport layer protocols (e.g., transmission control protocol (TCP), stream control transmission protocol (SCTP), user datagram protocol (UDP), quick UDP Internet connections (QUIC), etc.).

A network service provider can implement a proxy server to improve network performance by improving throughput, reducing latency, reducing radio access network (RAN) congestion, or the like. For example, a proxy server can cause a first TCP connection to be established with a user device (e.g., a client-side connection), and cause a second TCP connection to be established with a server device (e.g., a server-side connection). In this way, the proxy server can adjust respective rates of network traffic transmission of the server-side connection and the client-side connection. For example, the proxy server can implement an application buffer (e.g., a buffer that stores packets received from the server device), and adjust a transmission rate of the server device to ensure that the proxy server (i.e., the application buffer) stores a particular quantity of packets to provide to the user device.

When a user device attempts to establish a connection with a server device, a proxy server can establish a first TCP connection with the user device (e.g., a client-side connection), and the proxy server can generate a first socket for sending and receiving data between the user device and the proxy server. In some cases, the proxy server might thereafter fail to establish a second TCP connection with the server device (e.g., a server-side connection). For example, the server device might be unreachable, might be incapable of providing network traffic, or the like. As such, the proxy server might not establish a second socket for sending and receiving data between the proxy server and the server device. As such, the proxy server can allocate resources towards the first TCP connection despite the second TCP connection being incapable of being established, which can render the proxy server vulnerable to denial of service attacks, such as synchronize (SYN) flooding. In other words, the client-side connection can consume processor and/or memory resources of the proxy server (e.g., that otherwise could be allocated to another connection), and can consume network resources.

Some implementations described herein provide a proxy server to create a client-side TCP connection after a server-side TCP connection has been established. In some implementations, the proxy server can receive, from a user device, a TCP synchronize (SYN) packet associated with a request to establish a TCP connection with a server device, and can prevent a first TCP connection from being established between the proxy server and the user device after receiving the TCP SYN packet. Additionally, the proxy server can cause a second TCP connection to be established between the proxy server and the server device based on the TCP SYN packet. Additionally, the proxy server can cause a third TCP connection to be established between the proxy server and the user device after the second TCP connection is established. The proxy server can then transfer network traffic between the user device and the server device based on establishing the second TCP connection and the third TCP connection.

In this way, some implementations described herein permit the proxy server to reduce a number of situations where a client-side TCP connection is established despite a server-side TCP connection being incapable of being established, not being established, etc. In this way, some implementations described herein permit more efficient utilization of proxy server processor and/or memory resources and conserve network resources.

While some of the implementations described herein are described in association with TCP connections and/or describe TCP signaling, it should be understood that implementations described herein can be applicable to other types of connections and/or protocols that implement similar types of signaling.

Figure 1A:
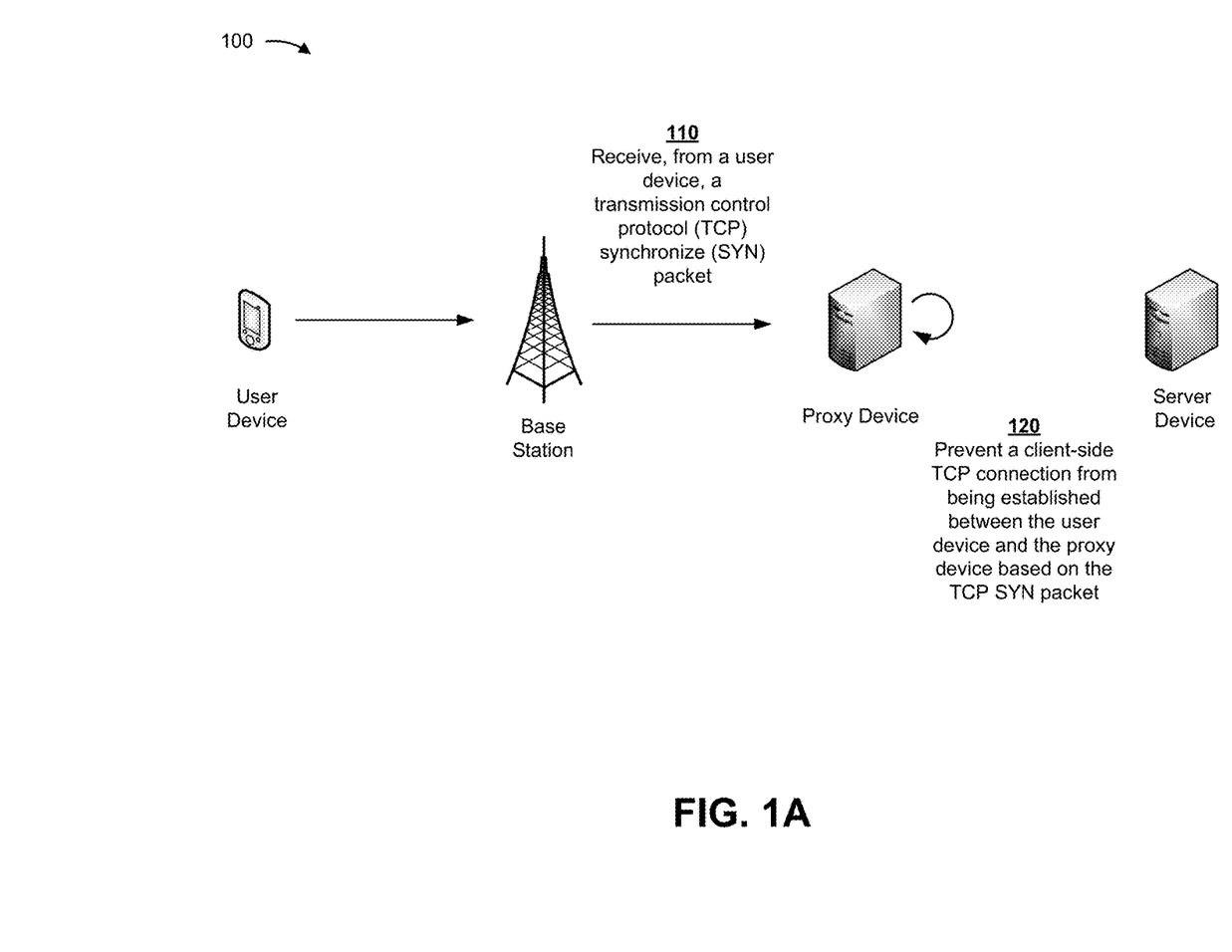
FIGS. 1A-1D are diagrams of an overview of an example implementation described herein.

FIGS. 1A-1D are diagrams of an overview of an example implementation 100 described herein. As shown in FIG. 1A, example implementation 100 can include a user device, a base station, a proxy device, and a server device. As further shown in FIG. 1A, and by reference number 110, the proxy device can receive, from the user device, a transmission control protocol (TCP) synchronize (SYN) packet. For example, the TCP SYN packet can be associated with a request to establish a connection with the server device.

As further shown in FIG. 1A, and by reference number 120, the proxy device can prevent a client-side TCP connection from being established between the user device and the proxy device based on the TCP SYN packet. In this way, the proxy device can delay establishing a client-side TCP connection with the user device until after a server-side TCP connection is established between the proxy device and the server device.

Figure 1B:
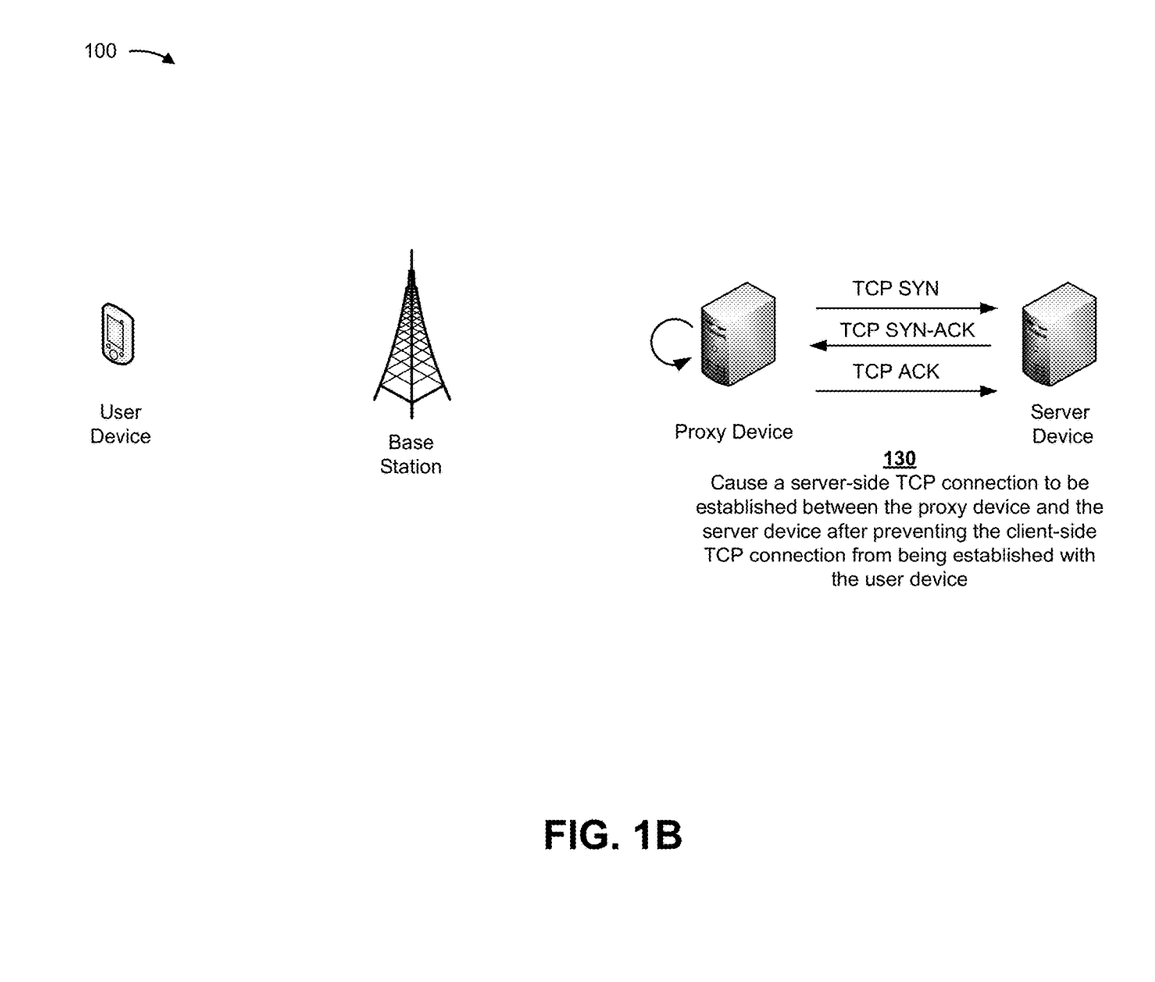

As shown in FIG. 1B, and by reference number 130, the proxy device can cause a server-side TCP connection to be established between the proxy device and the server device after preventing the client-side TCP connection from being established with the user device. For example, the proxy device can generate a server-side socket and attempt to establish a server-side TCP connection between the proxy device and the server device based on the TCP SYN packet that was received from the user device. In some implementations, the proxy device can store, in a data structure, an entry that includes information associated with the server-side socket, and can provide a TCP SYN packet to the server device. Thereafter, the proxy device can receive a TCP SYN acknowledgement (SYN-ACK) packet from the server device, and then provide a TCP ACK packet to the server device to establish the server-side TCP connection with the server device.

Figure 1C:
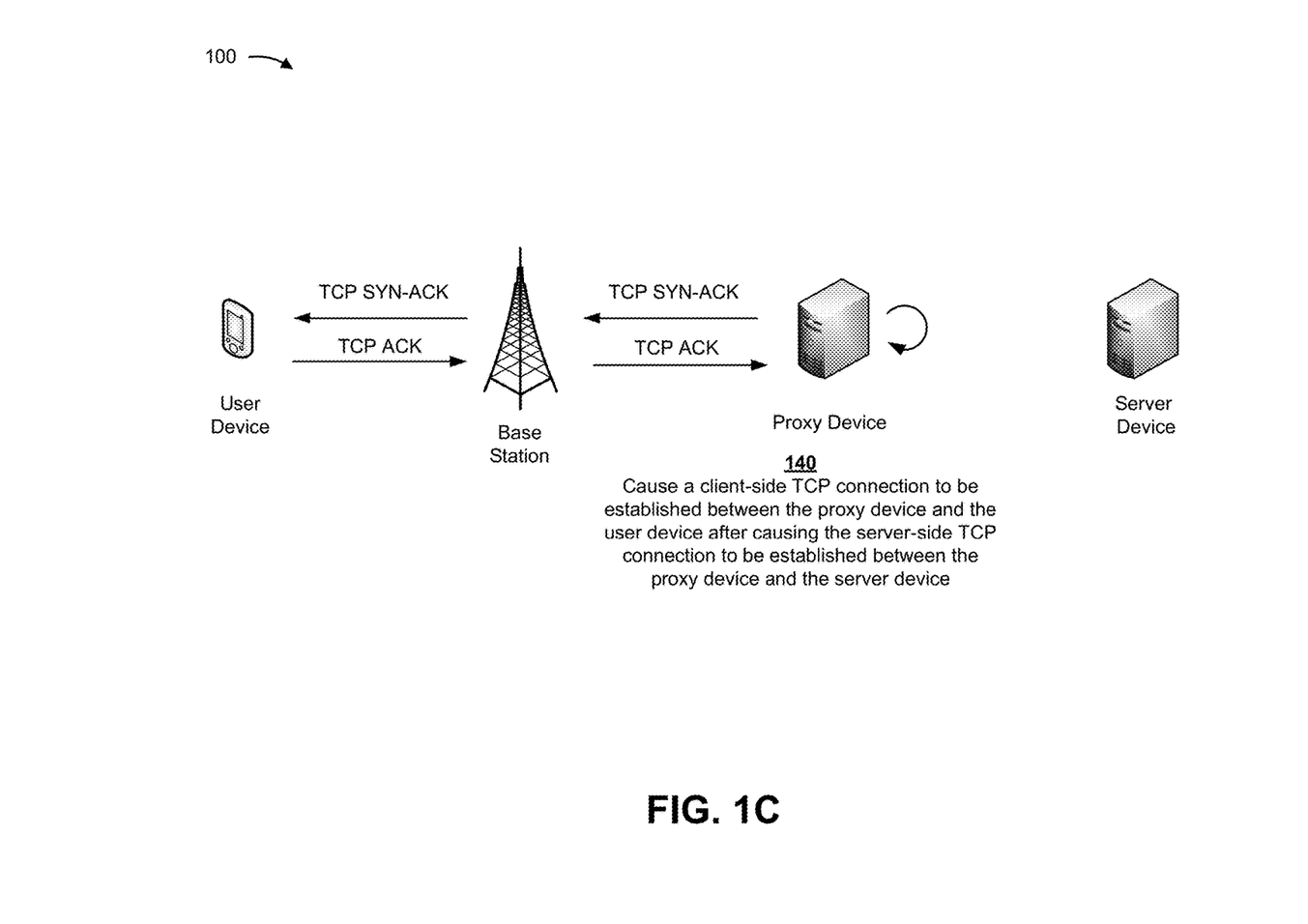

As shown in FIG. 1C, and by reference number 140, the proxy device can cause a client-side TCP connection to be established between the proxy device and the user device after causing the server-side TCP connection to be established between the proxy device and the server device. For example, the proxy device can provide, to a connection queue, a TCP SYN packet that includes information associated with the user device, can generate a client-side socket, and can modify the entry in the data structure to include information associated with the client-side socket. As further shown in FIG. 1C, the proxy device can provide, to the user device, a TCP SYN-ACK packet, and can then receive a TCP ACK packet from the user device.

Figure 1D:
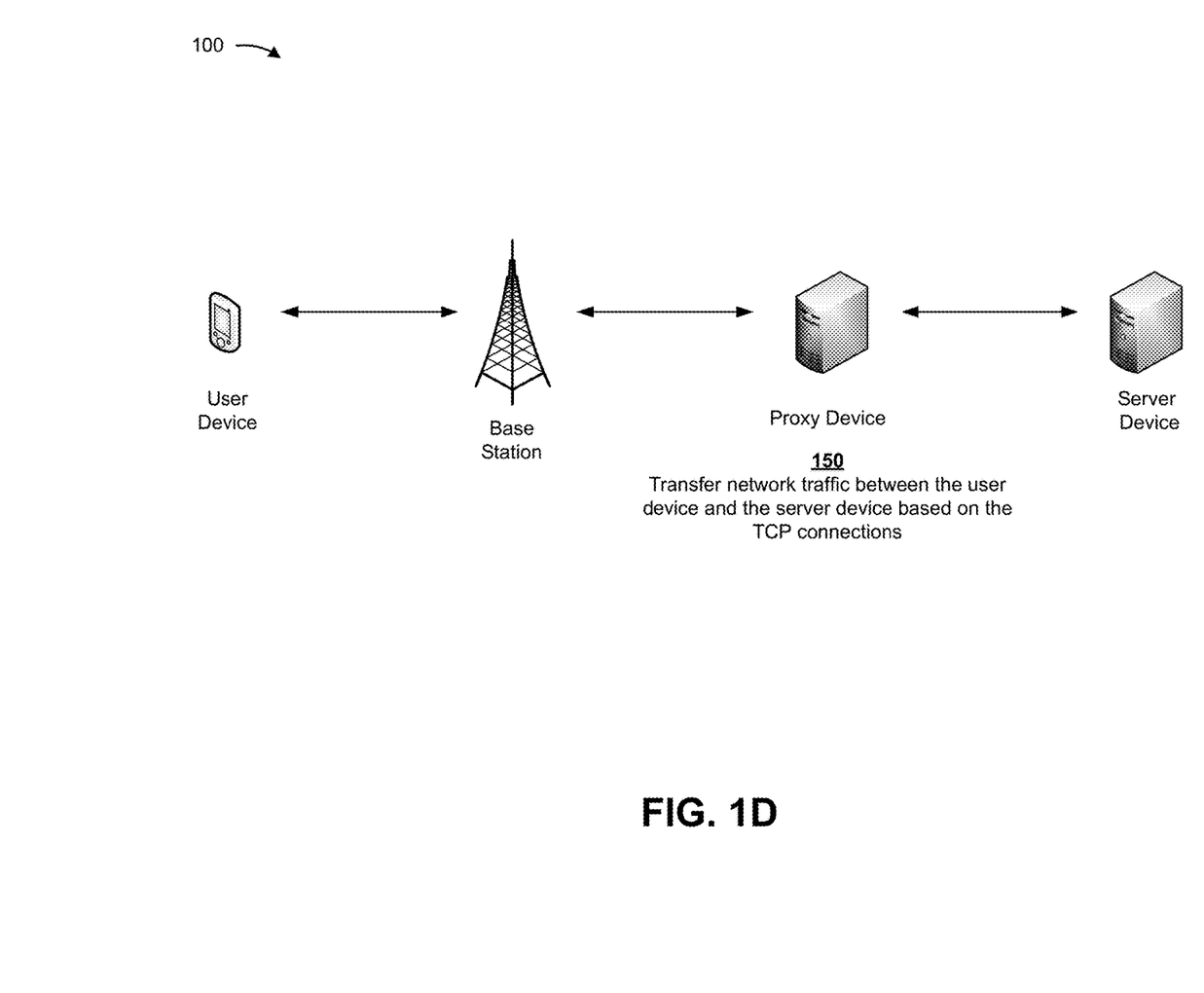

As shown in FIG. 1D, and by reference number 150, the proxy device can transfer network traffic between the user device and the server device based on the TCP connections. In this way, the proxy server can improve network performance by improving throughput, reducing latency, reducing RAN congestion, etc. while reducing a number of situations where client-side TCP connections are established despite server-side TCP connections being incapable of being established. In other words, the proxy server can delay causing client-side TCP connections to be established until after respective server-side TCP connections are established. In this way, some implementations described herein reduce resource consumption in situations where server-side connections are not established.

As indicated above, FIGS. 1A-1D are provided merely as an example. Other examples are possible and can differ from what was described with regard to FIGS. 1A-1D.

Figure 2:
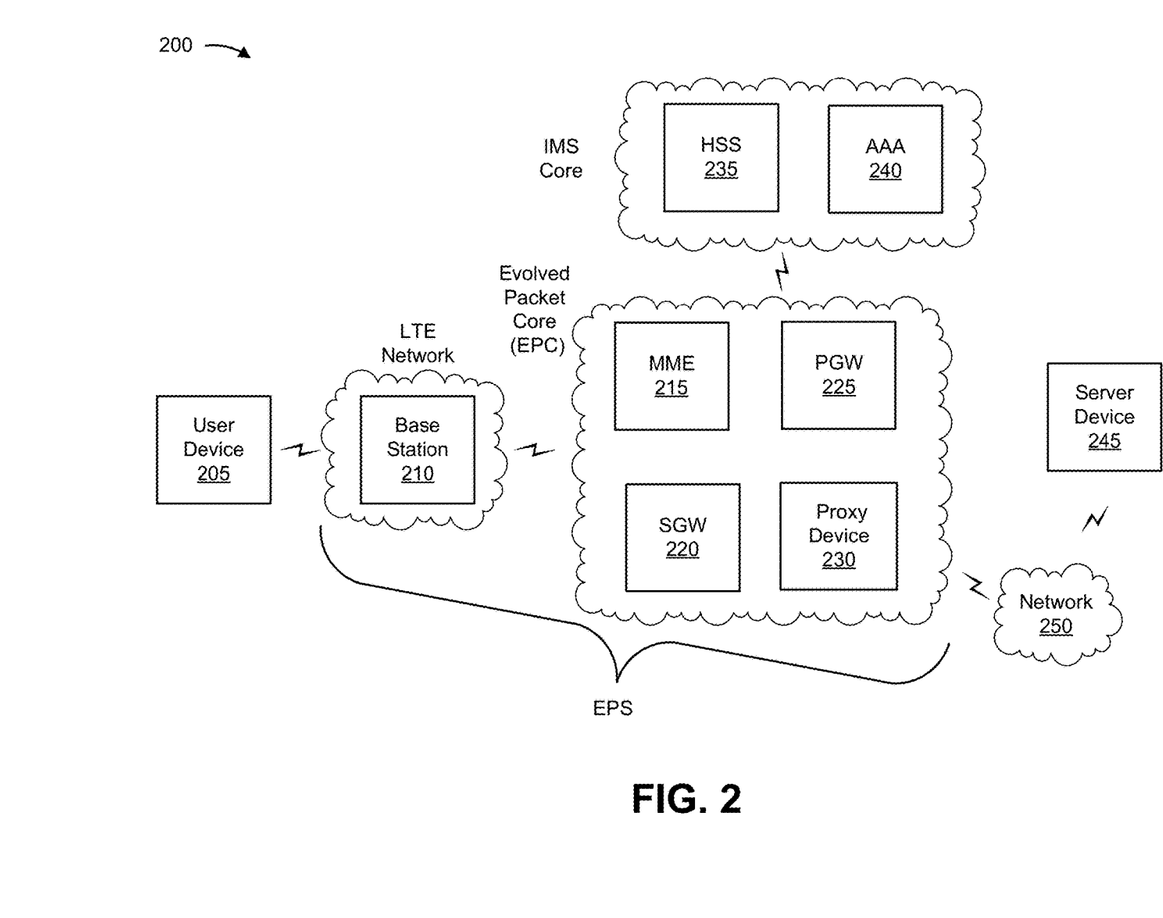
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205, a base station 210, a mobility management entity device (MME) 215, a serving gateway (SGW) 220, a packet data network gateway (PGW) 225, a proxy device 230, a home subscriber server (HSS) 235, an authentication, authorization, and accounting server (AAA) 240, a server device 245, and a network 250. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a fifth generation (5G) network, a third generation (3G) network, or another type of next generation network.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which user device 205 communicates with the EPC. The EPC can include MME 215, SGW 220, and/or PGW 225 that enable user device 205 to communicate with network 250 and/or an Internet protocol (IP) multimedia subsystem (IMS) core. The IMS core can include HSS 235 and/or AAA 240, and can manage device registration and authentication, session initiation, etc., associated with user devices 205. HSS 235 and/or AAA 240 can reside in the EPC and/or the IMS core.

User device 205 includes one or more devices capable of communicating with base station 210 and/or a network (e.g., network 250). For example, user device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. User device 205 can send network traffic to and/or receive network traffic from network 250 (e.g., via base station 210, SGW 220, and/or PGW 225).

Base station 210 includes one or more devices capable of transferring network traffic, such as audio, video, text, and/or other network traffic, destined for and/or received from user device 205. In some implementations, base station 210 can include an eNB associated with the LTE network that receives network traffic from and/or sends network traffic to network 250 via SGW 220 and/or PGW 225. Additionally, or alternatively, one or more base stations 210 can be associated with a RAN that is not associated with the LTE network. Base station 210 can send network traffic to and/or receive network traffic from user device 205 via an air interface. In some implementations, base station 210 can include a small cell base station, such as a base station of a microcell, a picocell, and/or a femtocell.

MME 215 includes one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve network traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers network traffic. In some implementations, SGW 220 can aggregate network traffic received from one or more base stations 210 associated with the LTE network, and can send the aggregated network traffic to network 250 (e.g., via PGW 225) and/or other network devices associated with the EPC and/or the IMS core. SGW 220 can also receive network traffic from network 250 and/or other network devices, and can send the received network traffic to user device 205 via base station 210. Additionally, or alternatively, SGW 220 can perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers network traffic. In some implementations, PGW 225 can aggregate network traffic received from one or more SGWs 220, and can send the aggregated network traffic to network 250. Additionally, or alternatively, PGW 225 can receive network traffic from network 250, and can send the network traffic to user device 205 via SGW 220 and base station 210. PGW 225 can record data usage information (e.g., byte usage), and can provide the data usage information to AAA 240.

Proxy device 230 includes one includes one or more devices capable of receiving, storing, processing, controlling, and/or providing network traffic (e.g., packets) associated with a flow. For example, proxy device 230 can include a server device (e.g., a proxy server), a cloud computing device, or a similar device. In some implementations, proxy device 230 can receive network traffic from server device 245 (e.g., via network 250) and can provide the network traffic to user device 205 (e.g., via base station 210) and/or can receive network traffic from user device 205 (e.g., via base station 210) and can provide the network traffic to server device 245 (e.g., via network 250).

As used herein, a packet can refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network. As used herein, a flow can refer to a sequence of packets that share common information, such as five-tuple information (e.g., a source address, a destination address, a source port identifier, a destination port identifier, and a protocol identifier).

HSS 235 includes one or more devices, such as one or more server devices, capable of managing (e.g., receiving, generating, storing, processing, and/or providing) information associated with user device 205. For example, HSS 235 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 235 can provide this information to one or more other devices of environment 200 to support the operations performed by those devices.

AAA 240 includes one or more devices, such as one or more server devices, that perform authentication, authorization, and/or accounting operations for communication sessions associated with user device 205. For example, AAA 240 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

Server device 245 includes one or more devices capable of receiving, generating, storing, processing, and/or providing network traffic. For example, server device 245 can include a server device (e.g., a host server, a web server, an application server, etc.), a data center device, or a similar device.

Network 250 includes one or more wired and/or wireless networks. For example, network 250 can include a cellular network (e.g., a 5G network, an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
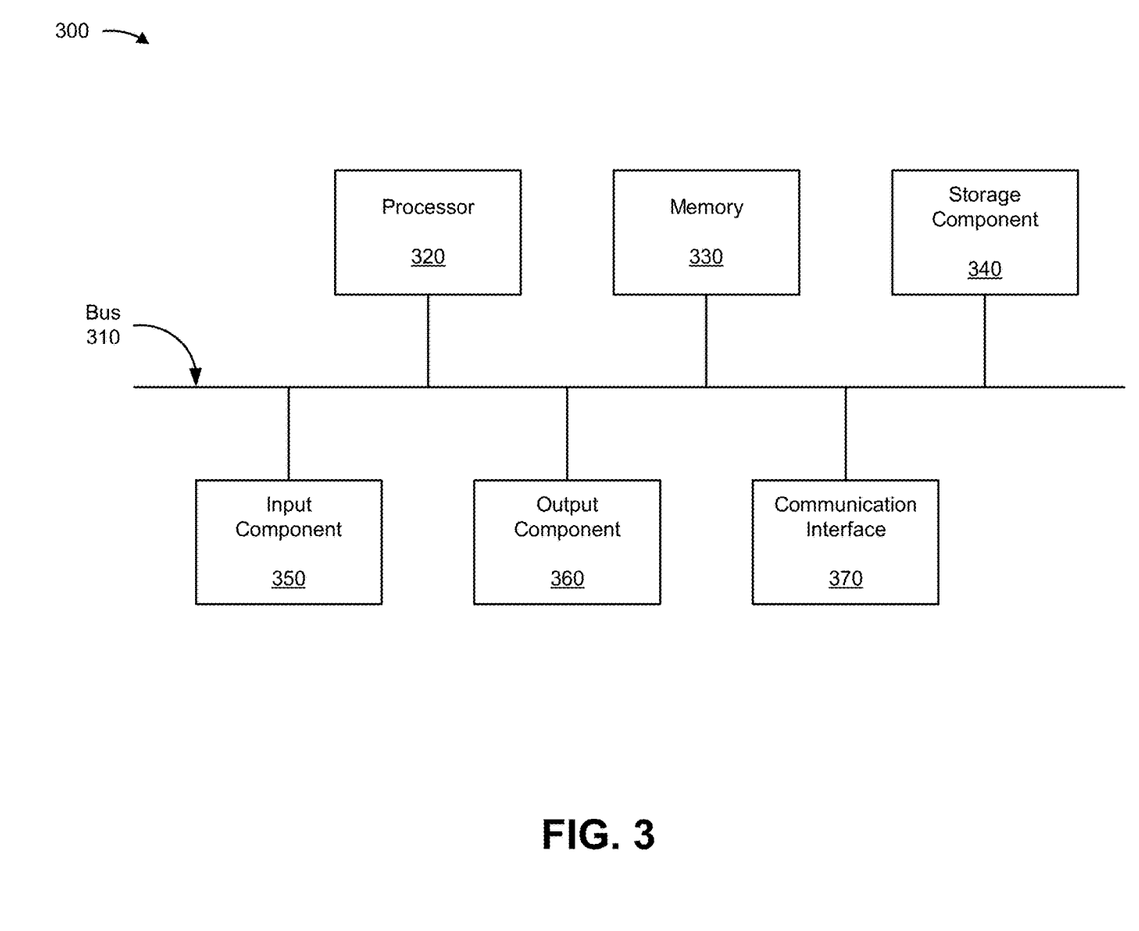
FIG. 3 is a diagram of example components of one or more devices of FIG. 2.

FIG. 3 is a diagram of example components of a device 300. Device 300 can correspond to user device 205, base station 210, MME 215, SGW 220, PGW 225, proxy device 230, HSS 235, AAA 240, and/or server device 245. In some implementations, user device 205, base station 210, MME 215, SGW 220, PGW 225, proxy device 230, HSS 235, AAA 240, and/or server device 245 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4A:
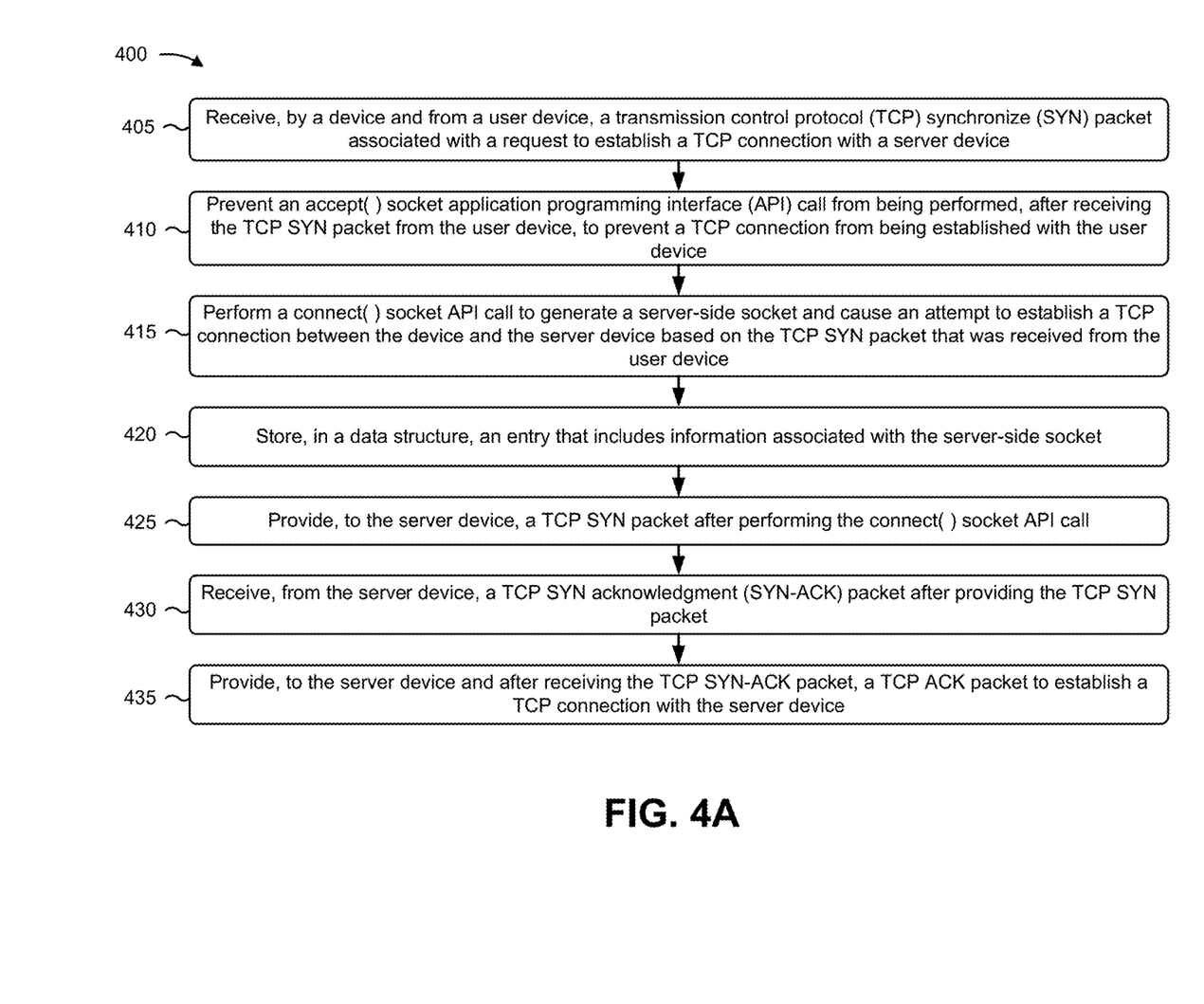
FIGS. 4A and 4B are flow charts of an example process for performing transmission control protocol (TCP) synchronize (SYN) signaling passthrough.
Figure 4B:
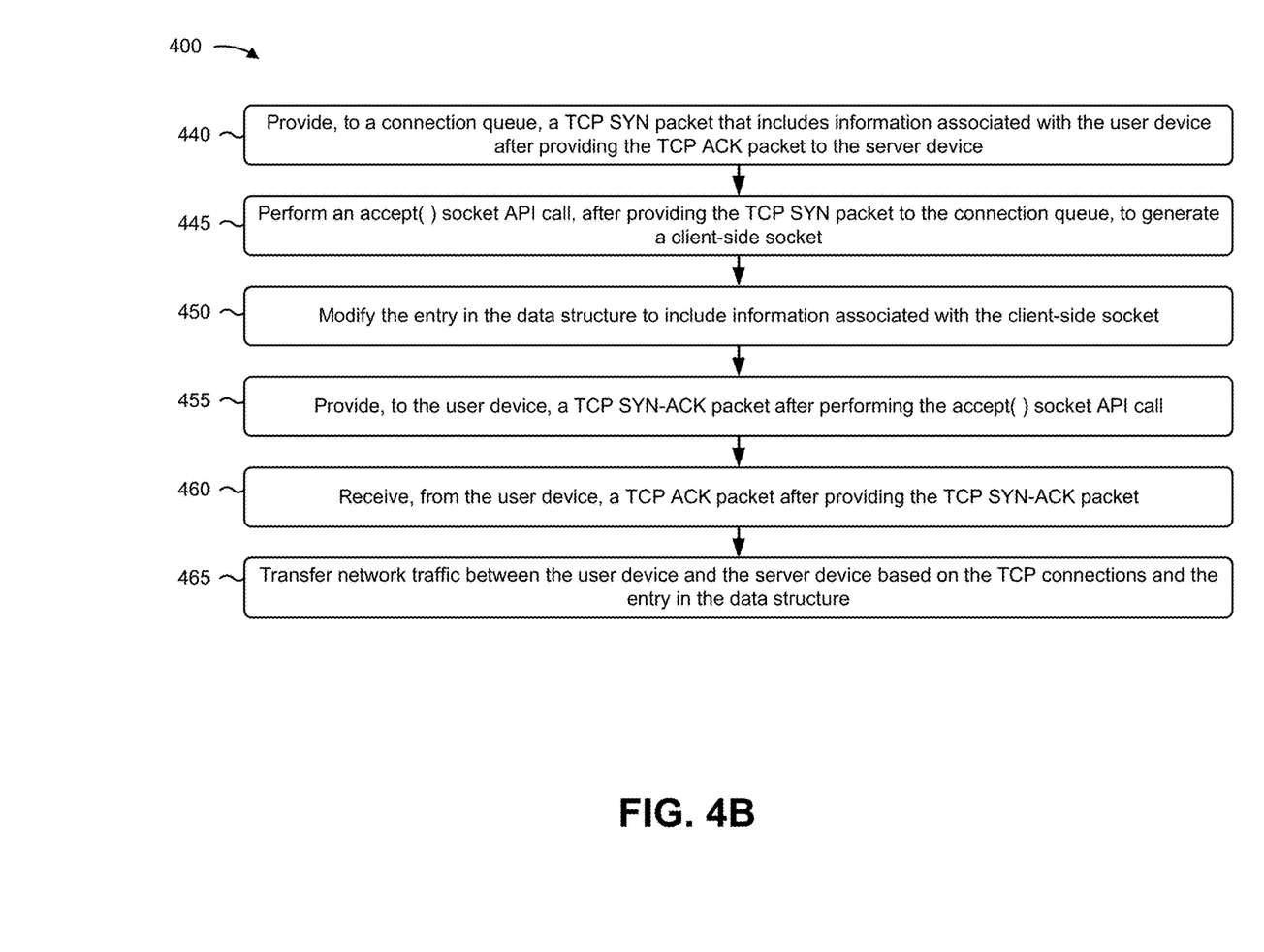

FIGS. 4A and 4B are flow charts of an example process 400 for performing transmission control protocol (TCP) synchronize (SYN) signaling passthrough. In some implementations, one or more process blocks of FIGS. 4A and/or 4B can be performed by proxy device 230. In some implementations, one or more process blocks of FIGS. 4A and/or 4B can be performed by another device or a group of devices separate from or including proxy device 230, such as user device 205, base station 210, MME 215, SGW 220, PGW 225, HSS 235, AAA 240, and/or server device 245.

As shown in FIG. 4A, process 400 can include receiving, by a device and from a user device, a transmission control protocol (TCP) synchronize (SYN) packet associated with a request to establish a TCP connection with a server device (block 405). For example, proxy device 230 can receive, from user device 205, a TCP SYN packet that is associated with a request to establish a TCP connection with server device 245. For example, user device 205 can provide a TCP SYN packet that includes particular five-tuple information, such as a source IP address of user device 205, a source port identifier of user device 205, a destination IP address of server device 245, a destination port identifier of server device 245, and a protocol identifier.

In some implementations, proxy device 230 can generate a socket using a socket( ) API call, and allocate resources to the socket. Additionally, proxy device 230 can use a bind( ) socket API call to associate the socket with a socket address structure, such as an IP address and a port identifier. Additionally, proxy device 230 can use a listen( ) socket API call to cause the socket to enter a listening state. In this way, proxy device 230 can receive TCP connection requests (e.g., TCP SYN packets) from user devices 205, store the TCP SYN packets in a connection queue, and generate sockets that are in an established state based on the connection requests. However, in some implementations, proxy device 230 can prevent a socket from being established after receiving a TCP SYN packet, as described below.

As further shown in FIG. 4A, process 400 can include preventing an accept( ) socket application programming interface (API) call from being performed, after receiving the TCP SYN packet from the user device, to prevent a TCP connection from being established with the user device (block 410). For example, proxy device 230 can prevent an accept( ) socket API call from being performed after receiving the TCP SYN packet from user device 205.

In some implementations, proxy device 230 can use an accept( ) socket API call to generate a TCP connection associated with a requesting device. For example, proxy device 230 can use an accept( ) socket API call to generate a socket, and associate the socket with a source IP address, a source port identifier, a destination IP address, a destination port identifier, a protocol, and/or a socket identifier.

By preventing an accept( ) socket API call from being performed, proxy device 230 can prevent a TCP connection from being established with user device 205. In this way, proxy device 230 can delay establishing a TCP connection with user device 205 until after a TCP connection is established between proxy device 230 and server device 245. In this way, proxy device 230 can reduce a number of situations where proxy device 230 establishes a TCP connection with user device 205 despite being incapable of establishing a TCP connection with server device 245.

Additionally, in this way, proxy device 230 can reduce a number of situations where proxy device 230 generates an entry, in a data structure, that is to be used to transfer network traffic between user device 205 and server device 245 and/or allocates resources towards transferring the network traffic. In this way, some implementations described herein conserve processor and/or memory resources of proxy device 230 by delaying the establishment of a TCP connection between proxy device 230 and user device 205 until after a TCP connection is established between proxy device 230 and server device 245, as described below.

As further shown in FIG. 4A, process 400 can include performing a connect( ) socket API call to generate a server-side socket and cause an attempt to establish a TCP connection between the device and the server device based on the TCP SYN packet that was received from the user device (block 415). For example, proxy device 230 can perform a connect( ) socket API call to cause an attempt to establish a TCP connection between proxy device 230 and server device 245.

In some implementations, proxy device 230 can generate a server-side socket based on the connect( ) socket API call. For example, proxy device 230 can generate a server-side socket by associating a socket with four-tuple information (e.g., an IP address of proxy device 230, a port identifier of proxy device 230, an IP address of server device 245, and a port identifier of server device 245). In some implementations, a server-side socket can refer to a socket that is associated with a TCP connection between proxy device 230 and server device 245 (e.g., that is used to transfer network traffic between proxy device 230 and server device 245).

As further shown in FIG. 4A, process 400 can include storing, in a data structure, an entry that includes information associated with the server-side socket (block 420). For example, proxy device 230 can store, in a data structure, an entry that includes information associated with the server-side socket.

In some implementations, proxy device 230 can utilize the data structure (e.g., a flow table, a routing table, a forwarding table, etc.) when transferring network traffic between user device 205 and server device 245. For example, proxy device 230 can store an entry that includes information associated with a server-side socket and a client-side socket (e.g., a socket associated with a TCP connection between user device 205 and proxy device 230). In this way, proxy device 230 can receive network traffic from server device 245 using the server-side socket, and identify, using the data structure, that the network traffic is to be forwarded to the client-side socket.

As further shown in FIG. 4A, process 400 can include providing, to the server device, a TCP SYN packet after performing the connect( ) socket API call (block 425). For example, proxy device 230 can provide, to server device 245, a TCP SYN packet after performing the connect( ) socket API call.

As further shown in FIG. 4A, process 400 can include receiving, from the server device, a TCP SYN acknowledgment (SYN-ACK) packet after providing the TCP SYN packet (block 430). For example, proxy device 230 can receive, from server device 245, a TCP SYN-ACK packet after providing the TCP SYN packet to server device 245. In some implementations, and in situations where proxy device 230 does not receive a SYN-ACK packet, does not receive a SYN-ACK within a threshold amount of time, or the like, proxy device 230 can delete the entry in the data structure. In this way, proxy device 230 can conserve processor and/or memory resources and/or more efficiently allocate resources in situations where server device 245 is unreachable, is not capable of providing network traffic, or the like.

As further shown in FIG. 4A, process 400 can include providing, to the server device and after receiving the TCP SYN-ACK packet, a TCP ACK packet to establish a TCP connection with the server device (block 435). For example, proxy device 230 can provide, to server device 245, a TCP ACK packet after receiving the TCP SYN-ACK packet. In this way, proxy device 230 can establish a TCP connection with server device 245. Additionally, in this way, proxy device 230 can determine that server device 245 is capable of providing network traffic to user device 205, and proxy device 230 can establish a TCP connection with user device 205 based on server device 245 being capable of providing the network traffic. Thereby, some implementations described herein reduce situations where proxy device 230 establishes a TCP connection with user device 205 despite server device 245 being incapable of providing network traffic. In this way, some implementations described herein conserve processor and/or memory resources of proxy device 230 and/or user device 205.

As shown in FIG. 4B, process 400 can include providing, to a connection queue, a TCP SYN packet that includes information associated with the user device after providing the TCP ACK packet to the server device (block 440). For example, proxy device 230 can provide, to a connection queue, a TCP SYN packet that includes information associated with user device 205 after establishing the TCP connection with server device 245.

In some implementations, a connection queue can refer to a data structure where connection requests are stored. In some implementations, proxy device 230 might have previously stored the TCP SYN packet that was received from user device 205 (e.g., as described in association with block 405). In this case, proxy device 230 can provide the TCP SYN packet to the connection queue. Alternatively, proxy device 230 can generate another TCP SYN packet that includes similar information as included in the original TCP SYN packet that was received from user device 205.

As further shown in FIG. 4B, process 400 can include performing an accept( ) socket API call, after providing the TCP SYN packet to the connection queue, to generate a client-side socket (block 445). For example, proxy device 230 can perform an accept( ) socket API call to generate a TCP connection with user device 205. Additionally, proxy device 230 can perform the accept( ) socket API call to generate a client-side socket. For example, as described elsewhere herein, a client-side socket can refer to a socket that is associated with a TCP connection between user device 205 and proxy device 230. In some implementations, the client-side socket can be associated with a socket identifier and four-tuple information (e.g., an IP address of proxy device 230, a port identifier of proxy device 230, an IP address of user device 205, and a port identifier of user device 205).

As further shown in FIG. 4B, process 400 can include modifying the entry in the data structure to include information associated with the client-side socket (block 450). For example, proxy device 230 can update the entry, that was generated in association with block 420, to include information associated with the socket identifier of the client-side socket. In this way, and as described elsewhere herein, proxy device 230 can transfer network traffic between user device 205 and server device 245 using the entry in the data structure.

As further shown in FIG. 4B, process 400 can include providing, to the user device, a TCP SYN-ACK packet after performing the accept( ) socket API call (block 455). For example, proxy device 230 can provide, to user device 205, a TCP SYN-ACK packet.

As further shown in FIG. 4B, process 400 can include receiving, from the user device, a TCP ACK packet after providing the TCP SYN-ACK packet (block 460). For example, proxy device 230 can receive, from user device 205, a TCP ACK packet after providing the TCP SYN-ACK packet. In this way, proxy device 230 can establish a TCP connection with user device 205, and transfer network traffic between user device 205 and server device 245, as described below.

As further shown in FIG. 4B, process 400 can include transferring network traffic between the user device and the server device based on the TCP connections and the entry in the data structure (block 465). For example, proxy device 230 can transfer network traffic between user device 205 and server device 245 based on the set of TCP connections. That is, proxy device 230 can receive, from server device 245, network traffic via the TCP connection between proxy device 230 and server device 245 and using the server-side socket. Additionally, proxy device 230 can provide, to user device 205, the network traffic via the TCP connection between proxy device 230 and user device 205 and using the client-side socket.

In some implementations, proxy device 230 can receive, from user device 205, network traffic via the TCP connection between user device 205 and proxy device 230 and using the client-side socket. Additionally, proxy device 230 can provide, to server device 245, network traffic via the TCP connection between proxy device 230 and server device 245 and using the server-side socket.

In this way, proxy device 230 can perform techniques to improve network performance, such as by adjusting transmission rates of the respective TCP connections, storing packets in a server-side application buffer and/or a client-side application buffer, or the like.

Although FIG. 4A and 4B show example blocks of process 400, in some implementations, process 400 can include additional blocks, fewer blocks, different blocks, or differently arranged blocks than those depicted in FIGS. 4A and 4B. Additionally, or alternatively, two or more of the blocks of process 400 can be performed in parallel.

Figure 5:
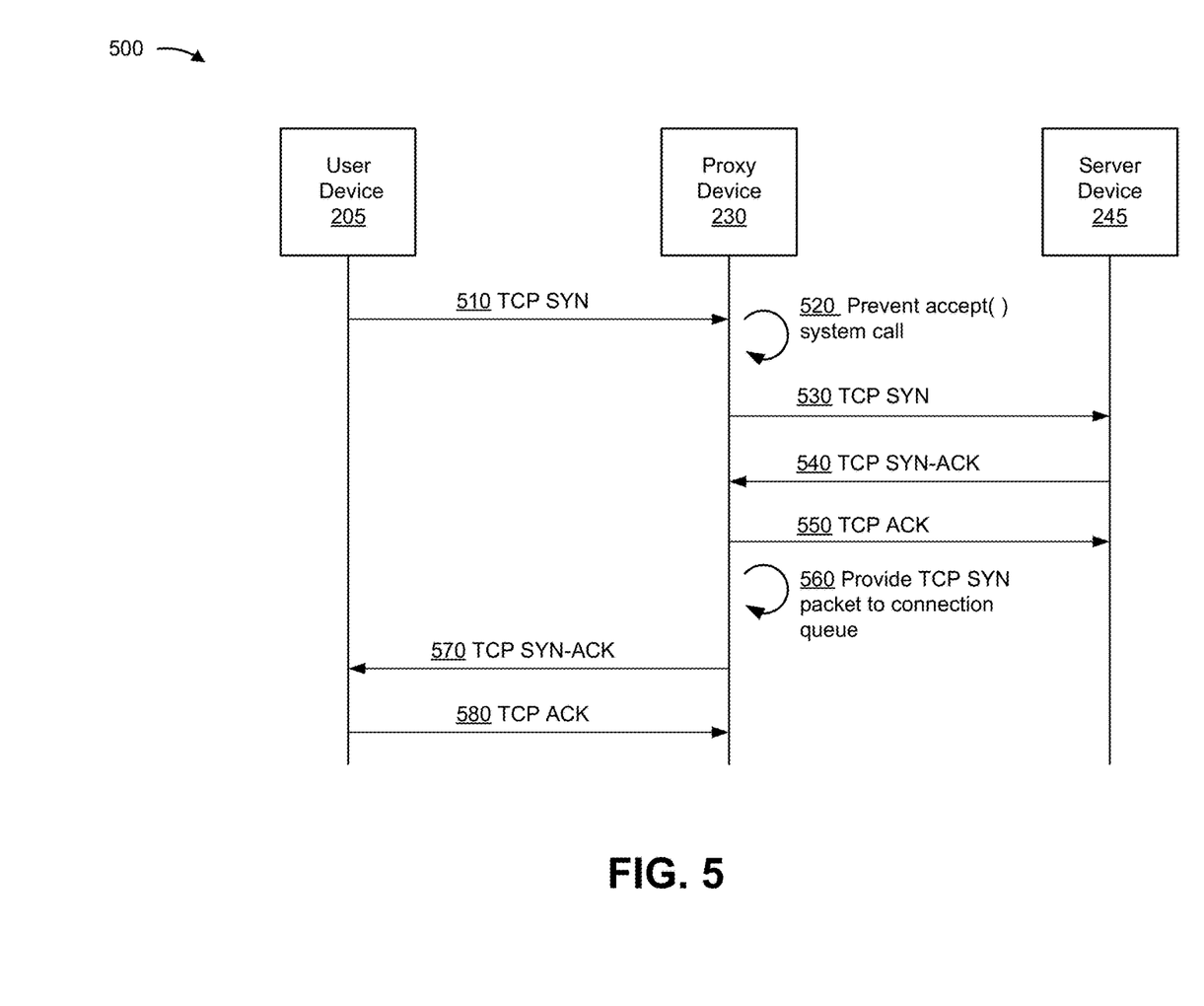
FIG. 5 is a diagram of a call flow of example operations capable of being performed by one or more devices of FIG. 2.

FIG. 5 is a diagram of a call flow of example operations capable of being performed by one or more devices of FIG. 2. For example, FIG. 5 is a call flow diagram of an example call flow 500 for performing transmission control protocol (TCP) synchronize (SYN) signaling passthrough.

As shown in FIG. 5, and by reference number 510, user device 205 can provide, to proxy device 230, a TCP SYN packet associated with a request to establish a TCP connection with server device 245. As shown by reference number 520, proxy device 230 can prevent an accept system call (e.g., an accept( ) socket API call) from being performed, after receiving the TCP SYN packet from user device 205, to prevent a TCP connection from being established with user device 205.

As further shown in FIG. 5, and by reference number 530, proxy device 230 can provide a TCP SYN packet to server device 245. As shown by reference number 540, server device 245 can provide, to proxy device 230, a TCP SYN-ACK packet after receiving the TCP SYN packet from proxy device 230. As shown by reference number 550, proxy device 230 can provide, to server device 245, a TCP ACK packet to establish a TCP connection with server device 245.

As further shown in FIG. 5, and by reference number 560, proxy device 230 can provide, to a connection queue, a TCP SYN packet that includes information associated with user device 205 after providing the TCP ACK packet to server device 245. As shown by reference number 570, proxy device 230 can provide, to user device 205, a TCP SYN-ACK packet. As shown by reference number 580, user device 205 can provide, to proxy device 230, a TCP ACK packet after receiving the TCP SYN-ACK packet from proxy device 230.

In this way, proxy device 230 can delay establishing a client-side TCP connection until after a server-side TCP connction is established. Thereby, some implementations described herein reduce a number of situations where resources are allocated towards client-side TCP connections despite corresponding server-side TCP connections being incapable of being established.

As indicated above, FIG. 5 is provided merely as an example. Other examples are possible and can differ from what was described with regard to FIG. 5. While a particular series of operations and/or data flows have been described above with regard to FIG. 5, the order of the operations and/or data flows can be modified in other implementations. Further, non-dependent operations can be performed in parallel.

Some implementations described herein provide a proxy server that creates a client-side TCP connection after a server-side TCP connection has been established. In this way, the proxy server can improve network performance by improving throughput, reducing latency, reducing RAN congestion, etc. and in such a manner that prevents flow table overflow, reduces vulnerability to denial of service attacks, reduces vulnerability to SYN flooding, or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, coupled to the one or more memories, to:
receive, from a user device, a transmission control protocol (TCP) synchronize (SYN) packet associated with a request to establish a TCP connection with a server device;
prevent a first TCP connection from being established between the device and the user device based on the TCP SYN packet;
cause a second TCP connection to be established between the device and the server device based on the TCP SYN packet and after preventing the first TCP connection from being established;
cause a third TCP connection to be established between the device and the user device after establishing the second TCP connection with the server device; and
transfer network traffic between the user device and the server device based on the second TCP connection and the third TCP connection.

2. The device of claim 1, where the one or more processors are further to:
prevent an accept socket application programming interface (API) call from being performed after receiving the TCP SYN packet; and
where the one or more processors, when preventing the first TCP connection from being established, are to:
prevent the first TCP connection from being established based on preventing the accept socket API call from being performed.

3. The device of claim 1, where the one or more processors are further to:
generate a first socket that is associated with the second TCP connection;
generate a second socket that is associated with the third TCP connection after generating the first socket; and
where the one or more processors, when transferring the network traffic, are to:
transfer the network traffic using the first socket and the second socket.

4. The device of claim 1, where the one or more processors are further to:
perform an accept socket API call after causing the second TCP connection to be established; and
where the one or more processors, when causing the third TCP connection to be established, are to:
cause the third TCP connection to be established after performing the accept socket API call.

5. The device of claim 1, where the one or more processors are further to:
generate another TCP SYN packet after receiving the TCP SYN packet; and
where the one or more processors, when causing the third TCP connection to be established, are to:
cause the third TCP connection to be established based on the other TCP SYN packet.

6. The device of claim 1, where the one or more processors are further to:
store the TCP SYN packet after receiving the TCP SYN packet from the user device; and
where the one or more processors, when causing the third TCP connection to be established, are to:
cause the third TCP connection to be established using the TCP SYN packet and after storing the TCP SYN packet.

7. The device of claim 1, where the one or more processors are further to:
adjust a first transmission rate of a flow associated with the second TCP connection,
the first transmission rate being different than a second transmission rate of
another flow associated with the third TCP connection; and
where the one or more processors, when transferring the network traffic between the user device and the server device, are to:
transfer the network traffic between the user device and the server device after adjusting the first transmission rate.

8. A non-transitory computer-readable medium storing instructions, the instructions comprising:
one or more instructions that, when executed by one or more processors of a device, cause the one or more processors to:
receive, from a user device, a transmission control protocol (TCP) synchronize (SYN) packet associated with a request to establish a TCP connection with a server device;
prevent a first TCP connection from being established between the device and the user device based on receiving the TCP SYN packet;
cause a second TCP connection to be established between the device and the server device based on the TCP SYN packet and after preventing the first TCP connection from being established;
cause a third TCP connection to be established between the device and the user device after establishing the second TCP connection with the server device; and
transfer network traffic between the user device and the server device based on the second TCP connection and the third TCP connection.

9. The non-transitory computer-readable medium of claim 8, where the one or more instructions, when executed by the one or more processors, further cause the one or more processors to:
prevent an accept socket application programming interface (API) call from being performed after receiving the TCP SYN packet; and
where the one or more instructions, that cause the one or more processors to prevent the first TCP connection from being established, cause the one or more processors to:
prevent the first TCP connection from being established by preventing the accept socket API call from being performed.

10. The non-transitory computer-readable medium of claim 8, where the one or more instructions, when executed by the one or more processors, further cause the one or more processors to:
generate a first socket that is associated with the second TCP connection;

generate a second socket that is associated with the third TCP connection after generating the first socket; and
where the one or more instructions, that cause the one or more processors to transfer the network traffic, cause the one or more processors to:
transfer the network traffic using the first socket and the second socket.

11. The non-transitory computer-readable medium of claim 8, where the one or more instructions, when executed by the one or more processors, further cause the one or more processors to:
perform an accept socket API call after causing the second TCP connection to be established; and
where the one or more instructions, that cause the one or more processors to cause the first TCP connection to be established, cause the one or more processors to:
cause the first TCP connection to be established based on performing the accept socket API call.

12. The non-transitory computer-readable medium of claim 8, where the one or more instructions, when executed by the one or more processors, further cause the one or more processors to:
store the TCP SYN packet after receiving the TCP SYN packt and based on preventing the first TCP connection from being established;
provide the TCP SYN packt to a socket of the device after causing the second TCP connection to be established; and
where the one or more instructions, that cause the one or more processors to cause the third TCP connection to be established, cause the one or more processors to:
cause the third TCP connection to be established based on providing the TCP SYN packet to the socket of the device.

13. The non-transitory computer-readable medium of claim 8, where the one or more instructions, when executed by the one or more processors, further cause the one or more processors to:
discard the TCP SYN packet after preventing the first TCP connection from being established;
generate another TCP SYN packet based on information associated with the TCP SYN packet and after discarding the TCP SYN packet; and
where the one or more instructions, that cause the one or more processors to cause the third TCP connection to be established, cause the one or more processors to:
cause the third TCP connection to be established after generating the other TCP SYN packet.

14. The non-transitory computer-readable medium of claim 8, where the one or more instructions, when executed by the one or more processors, further cause the one or more processors to:
store, in a buffer of the device, packets received in association with the second TCP connection; and
where the one or more instructions, that cause the one or more processors to transfer the network traffic between the user device and the server device, cause the one or more processors to:
transfer the network traffic between the user device and the server device after storing the packets in the buffer of the device.

15. A method, comprising:
receiving, by a device and from a first device, a transmission control protocol (TCP) synchronize (SYN) packet associated with a request to establish a TCP connection with a second device;
preventing, by the device, a first TCP connection from being established between the device and the first device based on the TCP SYN packet;
causing, by the device, a second TCP connection to be established between the device and the second device based on the TCP SYN packet and after preventing the first TCP connection from being established;
causing, by the device, a third TCP connection to be established between the device and the first device after establishing the second TCP connection with the second device; and
transferring, by the device, network traffic between the first device and the second device based on the second TCP connection and the third TCP connection.

16. The method of claim 15, further comprising:
preventing an accept socket application programming interface (API) call from being performed after receiving the TCP SYN packet; and
where preventing the first TCP connection from being established comprises:
preventing the first TCP connection from being established based on preventing the accept socket API call from being performed.

17. The method of claim 15, further comprising:
generating a first socket that is associated with the second TCP connection;
generating a second socket that is associated with the third TCP connection; and
where transferring the network traffic between the first device and the second device comprises:
transferring the network traffic between the first device and the second device using the first socket and the second socket.

18. The method of claim 15, further comprising:
performing an accept socket API call after causing the second TCP connection to be established; and
where causing the third TCP connection to be established comprises:
causing the third TCP connection to be established after performing the accept socket API call.

19. The method of claim 15, further comprising:
generating another TCP SYN packet after receiving the TCP SYN packet; and
where causing the third TCP connection to be established comprises:
causing the third TCP connection to be established using the other TCP SYN packet.

20. The method of claim 15, further comprising:
storing the TCP SYN packet after receiving the TCP SYN packet; and
where causing the third TCP connection to be established comprises:
causing the third TCP connection to be established using the TCP SYN packet and after storing the TCP SYN packet.

* * * * *